A. B. GARDINER, Jr.
HOLDING DEVICE FOR PASTEURIZING MILK.
APPLICATION FILED SEPT. 25, 1913.

1,086,814.

Patented Feb. 10, 1914.

Witnesses:
J. L. Garbacher
J. E. Diffenduffer

Inventor:
Asa B. Gardiner Jr.
By Chapin A. Ferguson
Attorney.

UNITED STATES PATENT OFFICE.

ASA B. GARDINER, JR., OF COCKEYSVILLE, MARYLAND.

HOLDING DEVICE FOR PASTEURIZING MILK.

1,086,814.  Specification of Letters Patent. Patented Feb. 10, 1914.

Application filed September 25, 1913. Serial No. 791,706.

*To all whom it may concern:*

Be it known that I, ASA B. GARDINER, Jr., a citizen of the United States, residing at Cockeysville, in the county of Baltimore and State of Maryland, have invented certain new and useful Improvements in Holding Devices for Pasteurizing Milk, of which the following is a specification.

This invention relates to improvements in holding devices for pasteurizing milk.

The object of my invention is to provide a milk holding device which is free from inlet or outlet valves, and by means of which the milk is held for any desired length of time and then discharged by tilting the receptacles, whereby the cream and skim milk will be thoroughly mixed without the use of agitators or other similar devices.

A further object of my invention is to so construct the milk holding receptacles that they may be easily and quickly cleansed when desired.

The invention consists of the novel construction and arrangement of the parts and combination of parts hereinafter more fully set forth in the following specification and pointed out in detail in the appended claims.

Figure 2:
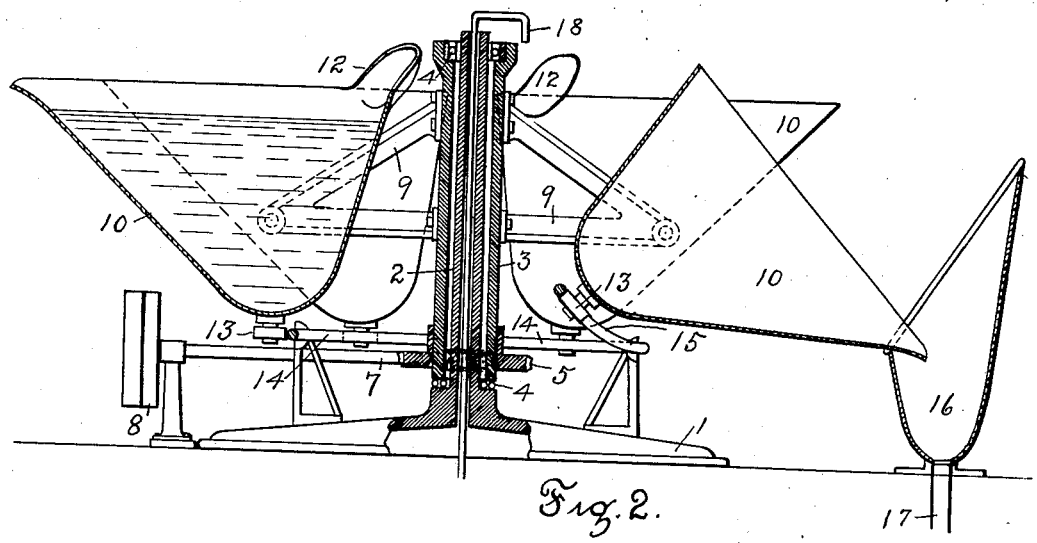
Figure 1:
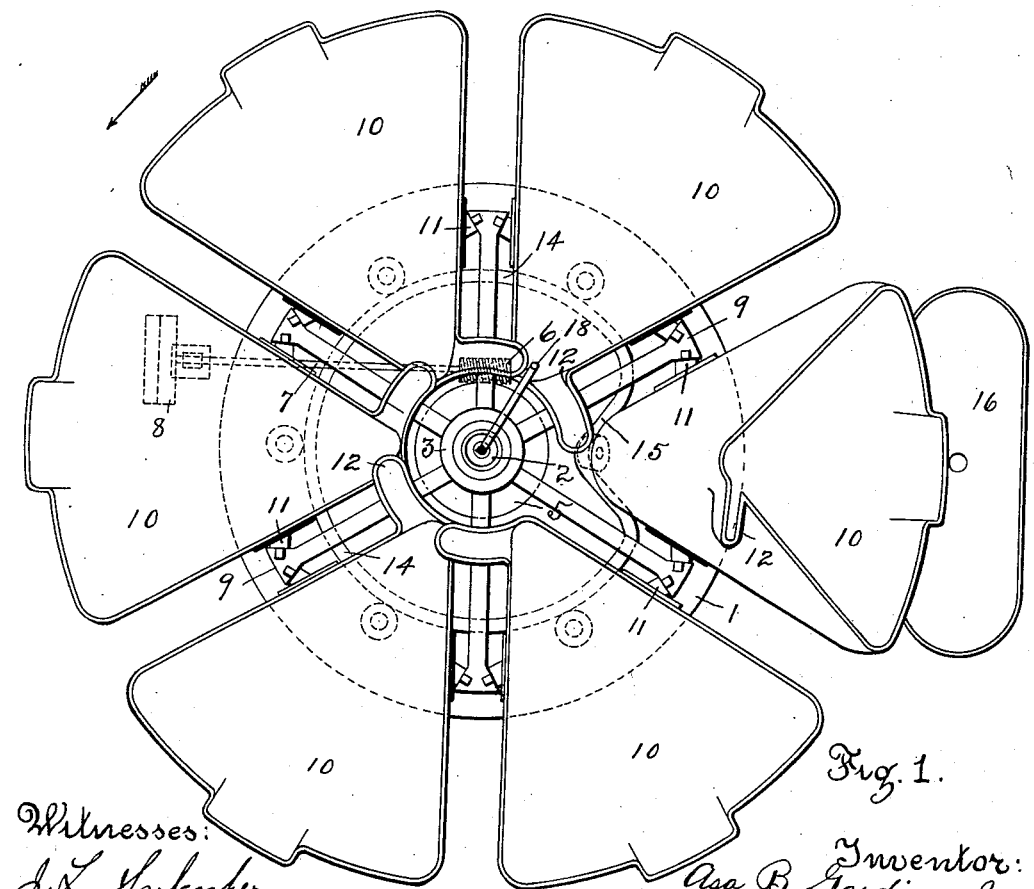

In the accompanying drawings,—Figure 1 is a plan view of my invention. Fig. 2 is a vertical sectional view of Fig. 1 showing one of the milk holding receptacles in the position of emptying its contents.

Referring to the accompanying drawings, forming part of this specification, and in which like reference numerals designate like parts throughout the several views thereof, 1 designates a metal base having a central hollow post 2, upon which latter is revolubly mounted a sleeve 3 provided with ball bearings 4, 4, at the top and bottom thereof. Near the lower end of the sleeve 3 is fixed a worm wheel 5 in mesh with the worm 6 on the driven shaft 7, which latter is provided with a pulley 8 to which power is transmitted from any suitable source of power for driving said shaft 7. To the said sleeve 3 are secured a number of laterally projecting brackets or arms 9. The milk holding receptacles 10 have their inner ends projecting in between said brackets or arms 9 and are provided with trunnions 11 on opposite sides thereof journaled in the outer ends of the said brackets or arms 9. Each of said milk holding receptacles 10 is provided with a lip 12 at its upper inner end which projects over the edge of the adjacent receptacle, for a purpose hereinafter set forth. The milk-holding receptacles 10 are hung in such a manner that the greater part thereof will be at the outer end in order to allow them to tilt independently of each other and empty their contents when brought in the proper position, and are held in their upright position by the rollers 13, which are revolubly mounted on the bottoms of said milk holding receptacles 10, and bear against the stationary rail or track 14, which latter is provided with an upwardly and inwardly projecting portion 15 which permits the said milk holding receptacles 10 to tilt and empty their contents into the chute 16 where it passes off through the pipe 17. The milk holding receptacles 10 are filled by the milk being pumped, or otherwise forced, through the supply pipe 18.

The operation of the device is as follows: The shaft 7 being rotated, the sleeve 3 will be revolved, through the medium of the worm wheel 5 and worm 6, carrying the milk holding receptacles 10 in the direction of the arrow in Fig. 1; at the same time the milk, which has been previously heated to the proper degree, is flowing through the supply pipe 18 to the milk holding receptacle directly under the discharge end of said pipe. The rotation of the said milk holding receptacles being so timed that as each is filled it passes from under the said discharge end of the supply pipe 18; each of said receptacles being provided with a lip 12 to catch the milk and carry it back to the passing receptacle until the next receptacle comes under the said discharge end of the supply pipe 18. After the milk has been carried in the said receptacles for a predetermined length of time and come in line with the chute 16 the inwardly and upwardly projecting portion of the track or rail 14 permits them to tilt and empty their contents successively into said chute, which tilting and emptying causes the cream and milk to thoroughly mix as it is carried off.

It will be seen from the foregoing description that the milk can be held for any desired length of time without the use of inlet or outlet valves, and that the milk holding receptacles being emptied by tilting thereof the cream and milk will be thoroughly mixed without the use of agitators or other similar devices. It will also be seen that when the milk holding receptacles are in the tilted position they can be readily and quickly cleansed.

Alterations in the construction and arrangement of the parts and combination of parts of my invention may be made, within the scope of the appended claims, without departing from the spirit thereof.

Having thus described my invention, what I claim is:

1. In a milk holding device, the combination of a number of independently operated milk holding receptacles each adapted to receive and hold the milk for a predetermined length of time, and means for tilting said milk-holding receptacles one at a time and independently of each other to empty the contents thereof.

2. In a milk holding device, the combination of a number of independently operated milk holding receptacles adapted to be filled in succession and hold the milk for a predetermined length of time, and means for successively tilting said milk holding receptacles to empty the contents thereof.

3. In a milk holding device, the combination of a base, a number of milk holding receptacles revolubly mounted on said base and adapted to be filled in succession and hold the milk for a predetermined length of time, and means for automatically tilting said milk holding receptacles successively to empty the contents thereof.

4. In a milk holding device, the combination of a base having a central post, a sleeve revolubly mounted upon said post, a number of milk holding receptacles pivotally mounted around said sleeve and adapted to receive and hold the milk for any desired length of time, means for revolving said sleeve, and means for automatically tilting said milk holding receptacles successively to empty the contents thereof.

5. In a milk holding device, the combination of a base having a central post, a sleeve revolubly mounted upon said post, means for revolving said sleeve, a number of laterally projecting arms secured to said sleeve, a number of milk holding receptacles pivoted between said arms and adapted to tilt thereon, a roller mounted on the bottom of each milk holding receptacle, a stationary trace or rail surrounding said sleeve against which the said rollers impinge and having a cam portion to permit said milk holding receptacles to tilt and empty their contents.

In testimony whereof I affix my signature in presence of two witnesses.

ASA B. GARDINER, Jr.

Witnesses:
CHAPIN A. FERGUSON,
EMMA BELL.